United States Patent
Stehling et al.

(10) Patent No.: US 9,587,763 B2
(45) Date of Patent: Mar. 7, 2017

(54) DEVICE FOR SECURING A FIRE HYDRANT VALVE USING A MOVEABLE ELEMENT

(71) Applicant: Hydra-Shield Mfg. Inc., Dallas, TX (US)

(72) Inventors: Fred J. Stehling, Lodi, WI (US); Terry McWilliams, DeSoto, TX (US); Roy Istre, Corsicana, TX (US)

(73) Assignee: HYDRA-SHIELD MFG. INC., Dallas, TX (US)

( * ) Notice: Subject to any disclaimer, the term of this patent is extended or adjusted under 35 U.S.C. 154(b) by 39 days.

(21) Appl. No.: 14/641,971

(22) Filed: Mar. 9, 2015

(65) Prior Publication Data

US 2016/0265683 A1    Sep. 15, 2016

(51) Int. Cl.

| F16K 35/16 | (2006.01) |
|---|---|
| E03B 9/04 | (2006.01) |
| F16K 31/44 | (2006.01) |
| E03B 9/06 | (2006.01) |

(52) U.S. Cl.
CPC ............ *F16K 35/16* (2013.01); *E03B 9/04* (2013.01); *E03B 9/06* (2013.01); *F16K 31/44* (2013.01)

(58) Field of Classification Search
CPC ............ F16K 35/16; F16K 31/44; E03B 9/04
See application file for complete search history.

(56) References Cited

U.S. PATENT DOCUMENTS

| 2,943,837 | A | * | 7/1960 | Noble | F16K 5/02 |
|---|---|---|---|---|---|
| | | | | | 251/110 |
| 3,626,961 | A | * | 12/1971 | Quinones | E03B 9/06 |
| | | | | | 137/296 |
| 3,840,041 | A | | 10/1974 | McMurray | |
| 3,916,939 | A | | 11/1975 | Gillard | |
| 4,390,038 | A | | 6/1983 | Salvato | |
| 4,454,934 | A | * | 6/1984 | Deveney | F16K 35/16 |
| | | | | | 188/171 |

(Continued)

FOREIGN PATENT DOCUMENTS

EP    0566483 B1    1/1996

*Primary Examiner* — Craig Schneider
*Assistant Examiner* — Kevin Barss
(74) *Attorney, Agent, or Firm* — Millen, White, Zelano & Branigan, P.C.; William Nixon

(57) ABSTRACT

A magnetic valve security device prevents unauthorized opening of fire hydrant valves. The magnetic valve security device includes an inner cylindrical member having a lower end with a recess to receive the valve nut in a non-rotational relationship and an upper end with a first coupling element. The magnetic valve security device also includes an outer rotational member mounted over the inner cylindrical member for rotation with respect to the inner cylindrical member. The outer rotational member includes a second coupling element. The magnetic valve security device also includes a movable element having a non-magnetic body configured to receive a fitted magnetizable piece. The movable element is urged to a first position to decouple the first and second coupling elements. The movable element is movable to a second position to couple the first and second elements in a non-rotational relationship. The rotation of the outer rotational member rotates the inner cylindrical member to rotate the valve stem and operate the valve with the movable element in the second position.

18 Claims, 8 Drawing Sheets

(56) References Cited

U.S. PATENT DOCUMENTS

| | | |
|---|---|---|
| 4,561,272 A | 12/1985 | Goldstein |
| 4,620,428 A | 11/1986 | Kopesky |
| 4,716,922 A | 1/1988 | Camp |
| 5,072,750 A | 12/1991 | Poms et al. |
| 5,205,312 A | 4/1993 | Jerman et al. |
| 5,596,893 A | 1/1997 | Stehling et al. |
| 6,802,338 B1 * | 10/2004 | Istre, Jr. .................... E03B 9/06 137/296 |
| 8,020,579 B2 * | 9/2011 | Ruhs ......................... E03B 9/06 137/296 |

* cited by examiner

DEVICE FOR SECURING A FIRE HYDRANT VALVE USING A MOVEABLE ELEMENT

FIELD OF THE INVENTION

The present invention relates to devices for securing a fire hydrant valve. More particularly, the present invention relates to magnetically operated devices for securing fire hydrant valves.

DISCUSSION OF THE RELATED ART

Municipal and county water departments are frequently confronted with the unauthorized use of fire hydrants by members of the public who, on occasion, open the valves of the hydrants to obtain water. Open fire hydrants can result in a drop in water pressure to customers and may occasionally endanger a community by reducing the availability of water necessary to fight fires.

In attempts to secure fire hydrants from unauthorized use, fire companies have employed locking devices such as a magnetic valve locks. This particular valve lock utilizes a magnetic detent that couples the valve operating nut of the fire hydrant to a sleeve which is freely rotatable with respect to the nut. The magnet is attracted by a second magnet permanently mounted in a wrench which cooperates with the sleeve to rotate the sleeve. With the help of magnets, sledge hammers and other nefarious devices, water thieves and vandals are increasingly able to defeat these magnetic locking devices.

Accordingly, there is a need for improvement in magnetic locks for fire hydrant operating valves that minimize the effectiveness of various techniques employed by unauthorized users to operate the valves.

SUMMARY OF THE INVENTION

Upon further study of the specification and appended claims, further features and advantages of this invention will become apparent to those skilled in the art.

In view of the aforementioned concerns, the disclosed embodiments provide a new and improved magnetic device for securing fire hydrant operating valves that render the operating valves difficult to open by unauthorized users while remaining easy to open by firemen.

According to the disclosed embodiments, a magnetic valve security device for a fire hydrant is disclosed. The fire hydrant includes a valve stem. The valve stem has a valve nut. The valve stem is connected to a valve. The rotation of the valve stem opens and closes the valve.

The device includes an inner cylindrical member having a lower end with a recess to receive the valve nut in a non-rotational relationship. The inner cylindrical member also has an upper end with a first coupling element. The device also includes an outer rotational member mounted over the inner cylindrical member for rotation with respect to the inner cylindrical member. The outer rotational member includes a second coupling element. The device also includes a movable element including a body configured to receive a fitted magnetizable piece. The movable element is urged to a first position to decouple the first and second coupling elements. The moveable element is movable to a second position to couple the first and second elements in a non-rotational relationship. The rotation of the outer rotational member rotates the inner cylindrical member to rotate the valve stem and operate the valve with the moveable element in the second position.

In another embodiment, a magnetic valve security device for a fire hydrant is disclosed. The device includes an inner cylindrical member having a lower end and an upper end with a first recess. The device also includes an outer rotational member mounted over the inner cylindrical member having a lower portion with a second recess aligned opposite the first recess. The device also includes a movable element located between the first recess and the second recess. The movable element has a body and a fitted magnetizable piece. The movable element is located in a first position within the first recess and movable to a second position between the first recess and the second recess using a magnetic force so as to couple the inner cylindrical member with the outer rotational member.

In a further embodiment, a wrench that is mechanically interlockable with the outer rotational member includes a permanent magnet with an extremely strong magnetic field that is integral with the wrench. The wrench is alignable with the movable element to move the moveable element from the first to the second position when the wrench is interlocked with the outer rotational member.

In a further embodiment, an annular sleeve is disposed between the inner cylindrical member and the outer rotational member. The sleeve in one embodiment is a hardened steel sleeve, and in another embodiment, is a nylon sleeve.

In a further embodiment, the inner cylindrical member includes a knurled portion that engages the cylindrical wall of a portion of the hydrant. This feature prevents the inner cylindrical member from rotating with respect to the hydrant body when the outer rotatable member has become sufficiently distorted to bind or weld with the inner cylindrical member.

In a further embodiment, the inner cylindrical member is armored with a hardened steel plate disposed around the periphery of the movable element. The plate cooperates with the hardened steel sleeve to shield the inner cylindrical member from drilling.

BRIEF DESCRIPTION OF THE DRAWINGS

The accompanying drawings are included to provide further understanding of the invention and constitute a part of the specification. The drawings listed below illustrate embodiments of the invention and, together with the description, serve to explain the principles of the invention, as disclosed by the claims and their equivalents.

DETAILED DESCRIPTION OF THE PREFERRED EMBODIMENTS

Figure 1:
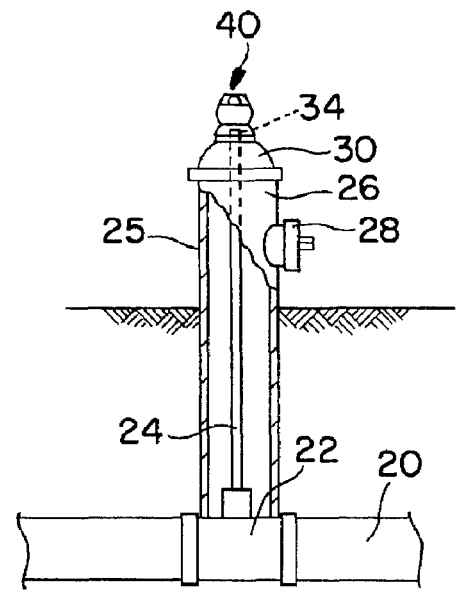
FIG. 1 illustrates a side view, partially in section, of a fire hydrant with a magnetic valve security device according to the disclosed embodiments.

Aspects of the invention are disclosed in the accompanying description. Alternate embodiments of the present invention and their equivalents are devised without parting from the spirit or scope of the present invention. It should be noted that like elements disclosed below are indicated by like reference numbers in the drawings.

Referring now to FIG. 1, there is shown a water line 20 having a valve 22 thereon which is opened by an elongated valve stem 24 to admit water into the body 25 of a fire hydrant 26. Upon opening a protective cap 28, water in the body 25 of the fire hydrant is available for use by a fire department. Fire hydrant 26 has a domed top 30 that has a circular recess 34 that is positioned having a pentagonal operating nut 36 fixed to elongated valve stem 24. Disposed on domed top 30 is a magnetic valve security device 40, which is configured in accordance with the principles of the disclosed embodiments.

Referring now to FIGS. 2-7, magnetic valve securing device 40, is shown in detail. Device 40 includes an inner cylindrical member 42. Inner cylindrical member 42 has a recess 44 in the shape of a pentagon that receives the pentagonal operating nut 36 shown in FIG. 7, which is fixed to or unitary with valve stem 24. Operating nut 36 has a threaded bore 46 therein, which receives threaded shank 48 of a bolt 50 to hold the inner cylindrical member 42 in assemblage with pentagonal nut 36. When inner cylindrical member 42 rotates, valve stem 24 is rotated to either open or close valve 22. This action lets water from the water line 20 into body 25 of hydrant 26, as shown in FIG. 1. Inner cylindrical member 42 has a square recess 52 in the top thereof. Square recess 52 is aligned with a bolt 50. Square recess 52 contains a movable element 54 that also is square in cross-section and compliments recess 52.

Figure 11A:
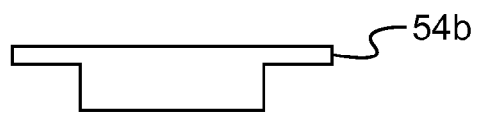
FIG. 11A illustrates a side view of a fitted piece according to the disclosed embodiments.
Figure 11B:
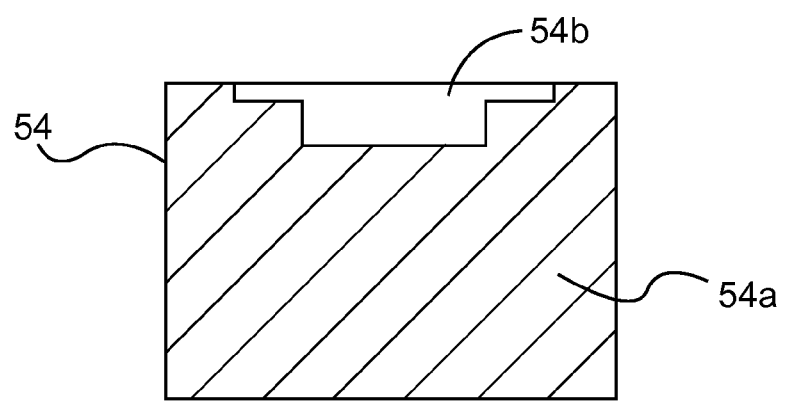
FIG. 11B illustrates a side view of a movable element for use within the valve security device according to the disclosed embodiments.
Figure 11C:
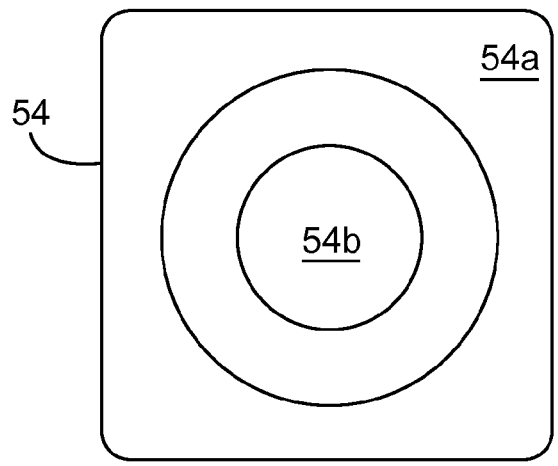
FIG. 11C illustrates a top view of a movable element for use within the valve security device according to the disclosed embodiments.

Movable element 54 is shown in FIGS. 11A-C. Movable element 54 is slidable in the direction of axis 56, but is not rotatable in square recess 52. Movable element 54 includes body 54a and fitted piece 54b. Body 54a preferably is comprised of cobalt. Fitted piece 54b preferably is comprised of 440C stainless steel, which is both magnetizable and rust resistant. Fitted piece 54b may be pressed into body 54a, such that no adhesive or material is needed to keep the fitted piece attached to the body. Alternatively, an adhesive or other material may be used. Preferably, fitted piece 54b is round and has a lower portion that extends into body 54a.

Such a configuration provides a snug fit. Fitted piece 54b, however, may be any shape or size to fit into body 54a.

Aligned with square recess 52 and movable element 54 is a second square recess 58 positioned in an outer rotatable member 60, which forms a cap for device 40. Outer rotatable member 60 is fixed for relative rotation on inner cylindrical member 42 by a split nylon washer 62 received in an inwardly facing groove 64 in the outer rotatable member, which split washer is interlocked with the inner cylindrical member, as will be further explained hereinafter. Outer rotatable member 60 is case 8620 steel, which is hardened to about RC 30.

Figure 2:
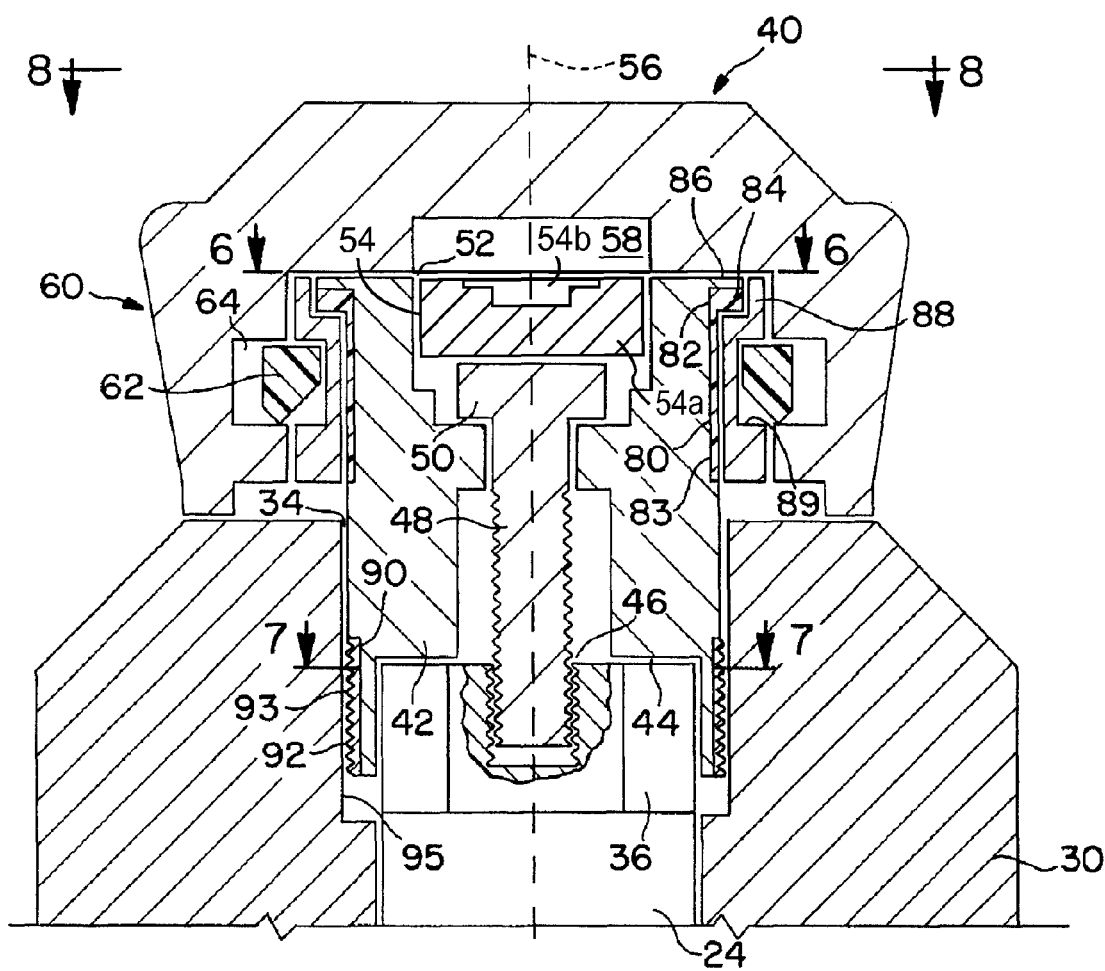
FIG. 2 illustrates a side elevation of an embodiment of a valve security device in an uncoupled mode according to the disclosed embodiments.

In normal operations, movable element 54 sits within recess 52 and not within recess 58. If outer rotatable member 60 is rotated about axis 56, then it will spin freely with respect to inner cylindrical member 42, valve nut 36 and valve stem 24. Thus, inner cylindrical member 42 cannot be operated by outer rotatable member 60 in this configuration. In FIG. 2, valve securing device 40 is shown in this uncoupled mode so that unauthorized users cannot open valve 22, shown in FIG. 1.

Figure 3:
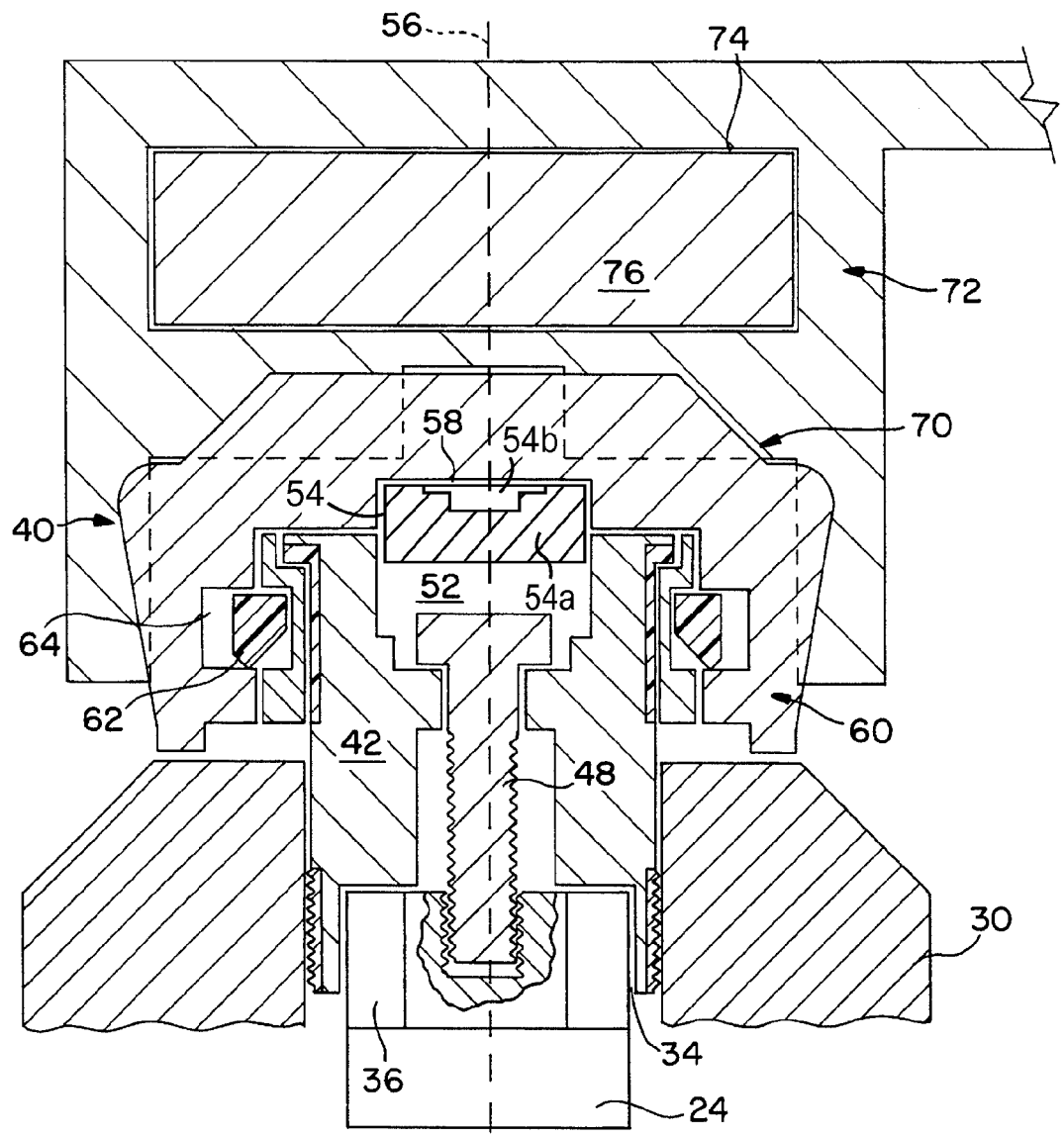
FIG. 3 illustrates the valve security device in a coupled mode for operation by a wrench according to the disclosed embodiments.
Figure 4:
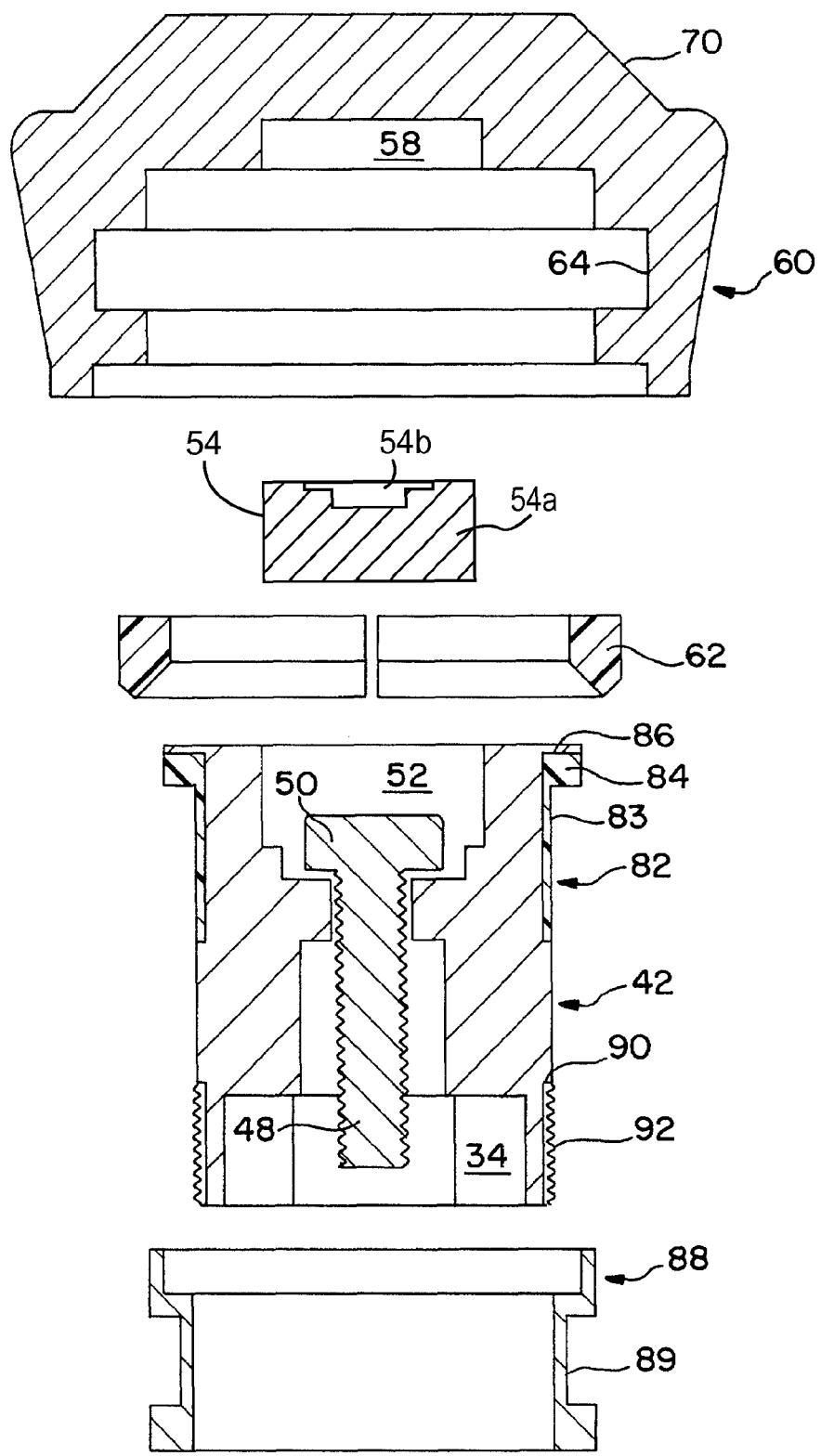
FIG. 4 illustrates an exploded view of the magnetic valve security device of FIGS. 2 and 3 according to the disclosed embodiments.
Figure 7:
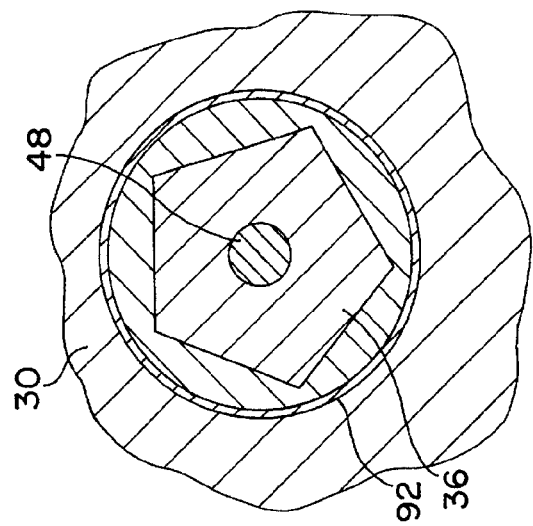
FIG. 7 illustrates a top elevational view taken along lines 7-7 of FIG. 2 according to the disclosed embodiments.
Figure 6:
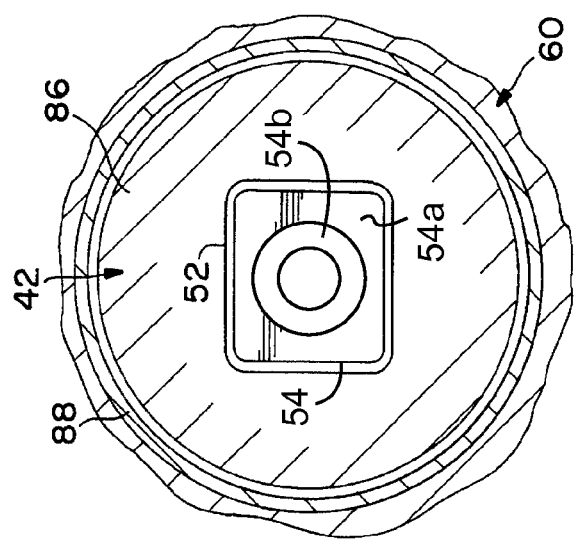
FIG. 6 illustrates a top elevational view taken along lines 6-6 of FIG. 2 according to the disclosed embodiments.

Referring to FIG. 3, it may be seen that movable element 54 is drawn into second rectangular recess 58 located in outer rotatable member 60. The depth of square recess 58 is such that it does not receive the entire thickness of movable element 54. Thus, a portion of movable element 54 remains outside of recess 58 and within square recess 52. Because recesses 52 and 58 are square and movable element 54 is square, inner cylindrical member 42 rotates when outer rotatable member 60 rotates in this configuration.

Figure 5:
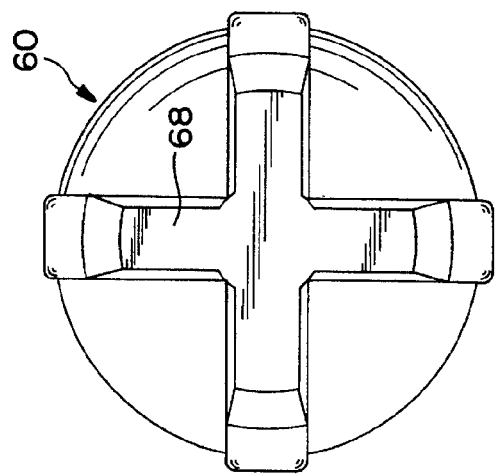
FIG. 5 illustrates a top view of the valve securing device shown in FIGS. 2-4 according to the disclosed embodiments.

As shown in FIG. 5, outer rotatable member 60 has a cruciform rib arrangement or portion 68 on the exterior thereof. The rib arrangement or portion is received in a complementary socket 70 of wrench 72. Accordingly, when wrench 72 is rotated about axis 56, outer rotatable member 60 rotates with the wrench. Wrench 72 includes a pocket 74 therein which encloses a permanent magnet 76. Permanent magnet 76 magnetizes movable element 54 via fitted piece 54b to pull the movable element upwardly into recess 58 so that the member is locked with respect to inner cylindrical member 42. This action drives valve stem 24 to rotate when wrench 72 turns outer rotatable member 60 about axis 56.

The disclosed embodiments include a number of features that enhance the effectiveness of operating valve security device 40. The first feature is to have movable element 54 include body 54a and fitted piece 54b. Fitted piece 54b is made of a material that requires a strong reaching magnet for induction, such as reaching magnet 76. Reaching magnet 76 is prohibitively expensive and difficult to obtain. Thus, an unauthorized person utilizing ordinary magnets obtainable through a retail outlet will be unable to move movable element 54 from the position shown in FIG. 2 to the one shown in FIG. 3. Further, with the relative small size of fitted piece 54b to body 54a, which is preferably non-magnetic, a powerful reaching magnet 76 is needed to move movable element 54.

In order to make it more difficult for an unauthorized user to defeat fire hydrant security device 40, inner cylindrical member 42 includes an annular indentation 80 that receives a nylon sleeve 82. Nylon sleeve 82 has a generally cylindrical portion 83 and a lip 84 that abuts a peripheral flange 86 on inner cylindrical member 42. Surrounding nylon sleeve 82 is an intermediate sleeve 88 that includes a groove 89 therein in which split nylon ring 62 is located. Because split nylon ring 62 is located in groove 64 of outer rotatable member 60, it is not slidably removable in the direction of axis 56.

Intermediate sleeve 88 rotates freely with respect to nylon sleeve 82 as does outer rotatable member 60 unless movable element 54 is moved from the position shown in FIG. 2 to the one shown in FIG. 3, thereby locking inner cylindrical member 42 and outer rotatable member 60 to one another. Nylon sleeve 82 provides a barrier that prevents intermediate member 88 from becoming welded or stuck to inner cylindrical member 42 so that when a vandal strikes device 40 with a sledge hammer, welding or sticking does not occur between outer rotatable member 60, intermediate member 88 and inner cylindrical member 42. Outer rotatable member 60 remains freely rotatable with respect to inner cylindrical member 42.

At its lower end, inner cylindrical member 42 has a second annular indentation 90 that receives a knurled sleeve 92. Knurled sleeve 92 has an outer surface 93 that is roughened with very small projections or teeth. The projections or teeth are positioned adjacent smooth annular wall 95 of cap 30. If an unauthorized person attempts to bind outer rotatable member 60 to inner cylindrical member 42 by applying torque tending to tilt outer rotatable member 60 slightly with respect to axis 56, teeth 93 of knurled surface 92 bite into the surface of wall 95. This action prevents outer rotatable member 60 from rotating at all. Consequently, even if contact is gained against inner cylindrical member 42 by tilting outer rotatable member 60, valve stem 24 may not be rotated because outer rotatable member 60 is not rotatable. Knurled sleeve 92 and nylon sleeve 82 provide security supplemental to movable element 54. These features further enhance the effectiveness of security device 40.

Figure 8:
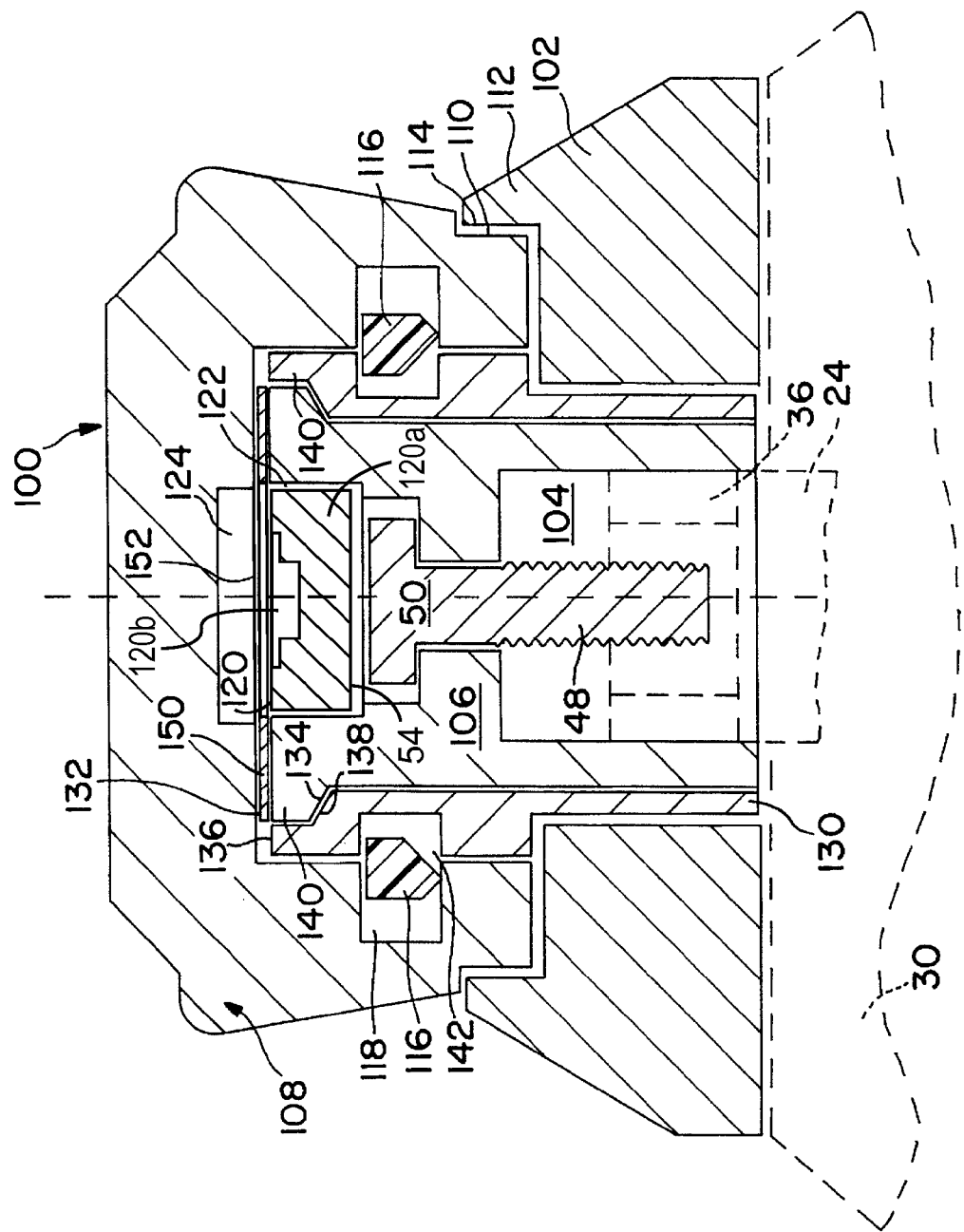
FIG. 8 illustrates a side elevational view of another embodiment of a magnetic valve security device showing the device in an uncoupled mode according to the disclosed embodiments.
Figure 9:
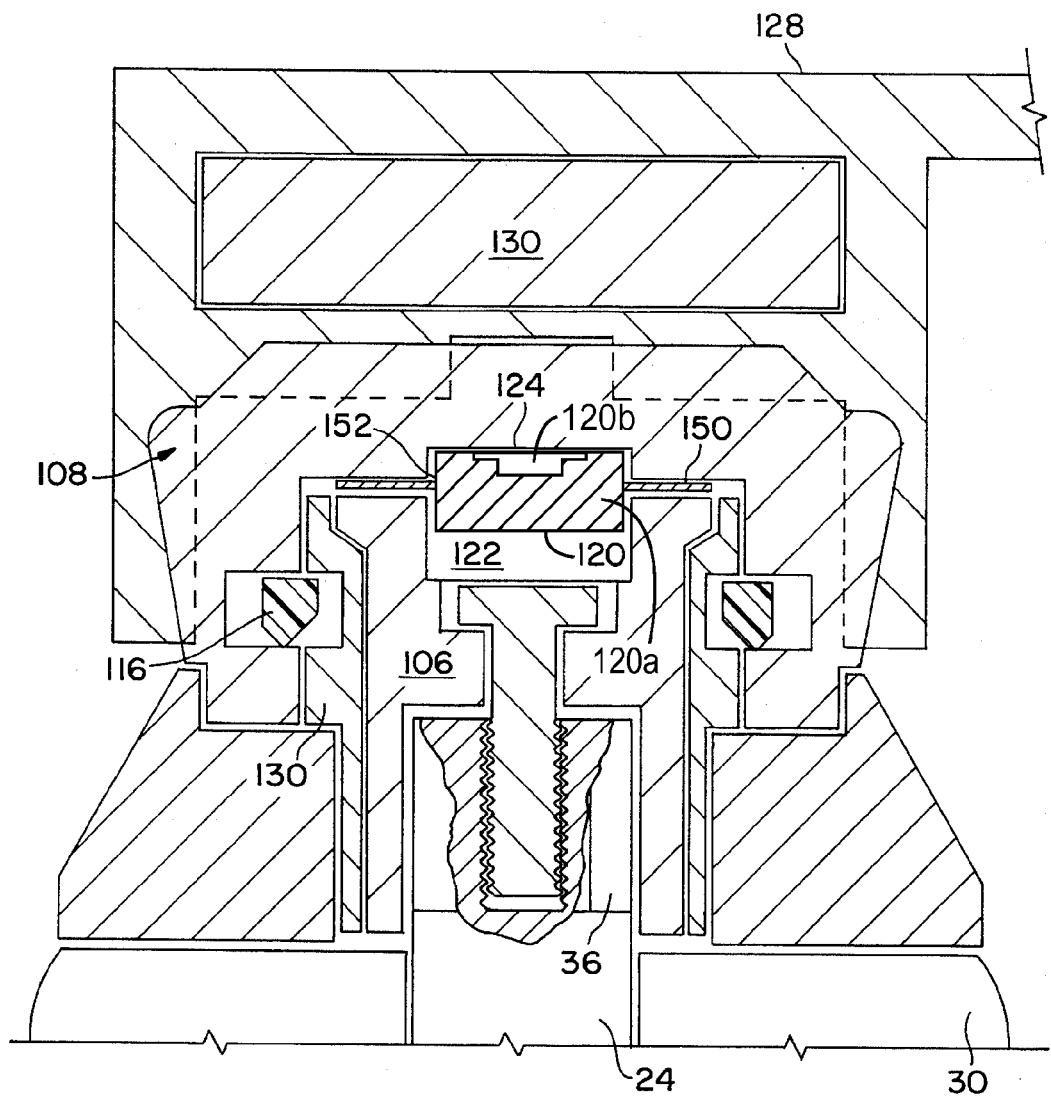
FIG. 9 illustrates a view showing the security device of FIG. 8 in an uncoupled mode according to the disclosed embodiments.
Figure 10:
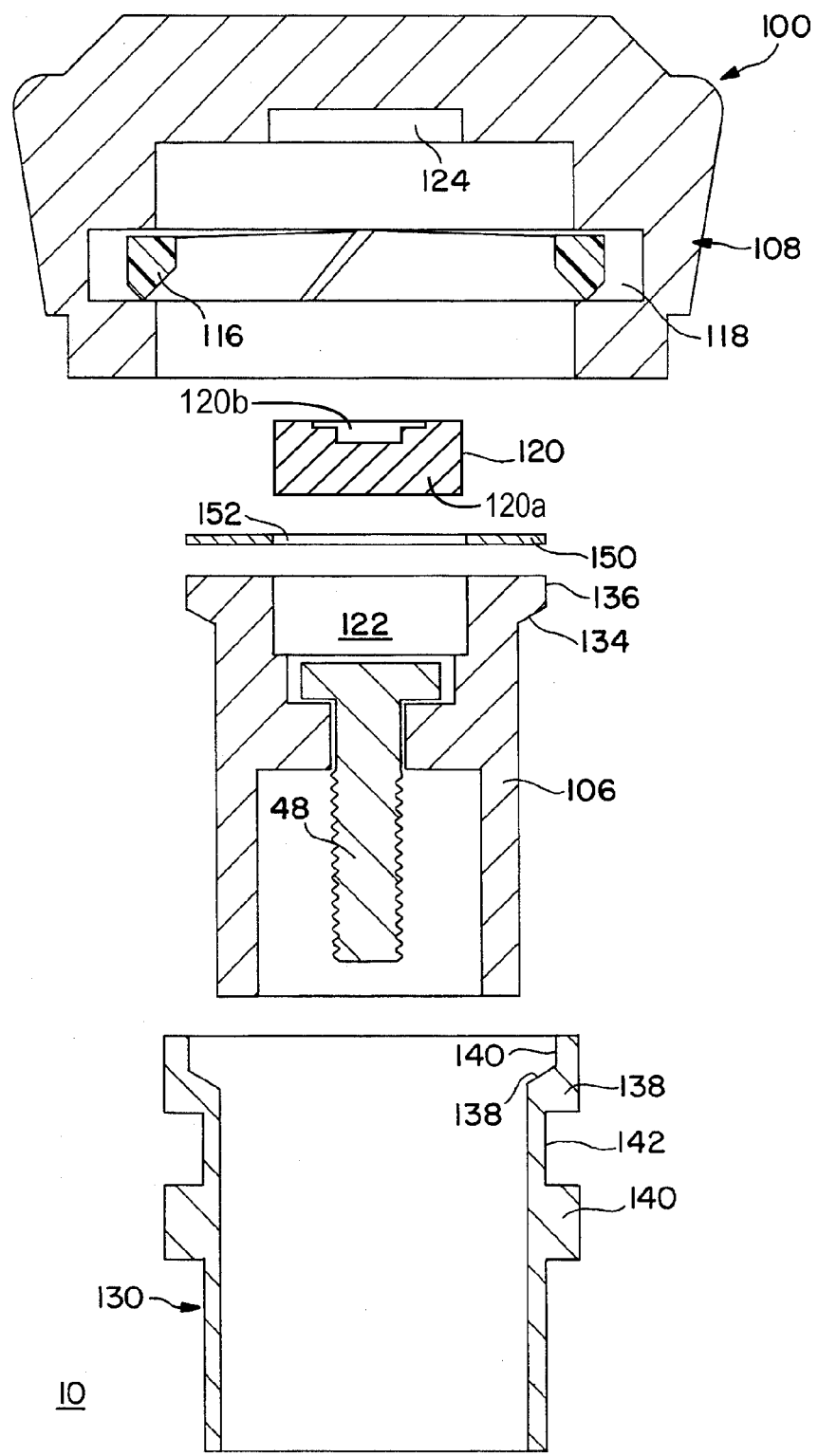
FIG. 10 illustrates an exploded view of the valve security device shown in FIGS. 8 and 9 according to the disclosed embodiments.

Referring now to FIGS. 8, 9 and 10, there is shown an embodiment of the present invention, shown as valve securing device 100. Valve securing device 100 is mounted on a fire hydrant, such as fire hydrant 25 of FIG. 1, to secure valve 22. Valve securing device 100 includes a thick rotatable collar 102 that is freely rotatable with respect to cap 30 of fire hydrant 25. Valve securing device 100 of FIGS. 8-10 utilizes a bolt 50 with a threaded shank 48 for securing device 100 to a hex nut 36 unitary with valve stem 24. The type of fire hydrant utilizing security device 100 may have a projecting pentagonal nut 36 that is received within a pentagonal opening 104 in an inner cylindrical member 106. Thick rotatable collar 102 is positioned coaxially with respect to nut 36 to block lateral access to the area occupied by the nut.

Inner cylindrical member 106 is surrounded at its upper end by an outer rotatable member 108, which forms a cap of 8620 steel that is case hardened to about 58 RC. Outer rotatable member 108 has at its lower end an annular groove 110. Annular groove 110 accommodates a projecting annular shoulder 112 extending from thick collar 102 so that outer rotatable member 108 is nested within an indentation 114 in the thick collar. Outer rotatable member 108 is axially locked with respect to inner rotatable member 106 by a split nylon washer 116 that is received within a groove 118.

The disclosed embodiments include a movable element 120 comprising body 120a and fitted piece 120b. Movable element 120 may resemble movable element 54, as disclosed above. Movable element 120 is received in a square recess 122 in inner cylindrical member 106. Square recess 122 aligns with a square recess 124 in outer rotatable member 108.

As shown in FIG. 9, when wrench 128 with a permanent magnet 130 is placed on outer rotatable member 108, fitted piece 120b of movable element 120 is magnetized to move the movable element into recess 124. This action couples outer rotatable member 108 to inner cylindrical member 106 so that applying torque to wrench 128 causes the inner cylindrical member to rotate nut 36 to open valve 22, as shown in FIG. 1. Body 120a may be comprised of cobalt, or other similar material.

In the embodiments depicted in FIGS. 8-10, a hardened carbon steel sleeve 130 is disposed around inner cylindrical member 106. Carbon steel sleeve 130 is held in axial position with respect thereto by annular shoulder 132 that has a frustoconical ramp portion 134 and an axially extending portion 136. Preferably, sleeve 130 is 8620 steel carbonized and hardened to 58-60 RC and 0.030 case dipped. Sleeve 130 has a shoulder 138 that abuts ramp 134 and an axially extending surface 140 that is adjacent axially extending surface 136 on inner cylindrical member 106. A groove 142 cooperates with groove 118 on outer rotatable member 108 with respect to hardened steel sleeve 130 and inner cylindrical member 106.

Positioned over the top surface of inner cylindrical member 106 is a cobalt steel washer 150, cast in size. Steel washer 150 includes a recess 152 aligned with square recess 122 of inner cylindrical member 106. Movable element 120 can slide through steel washer 150 via recess 152 into square recess 124 in outer rotatable member 108. Fitted piece 120b is magnetized to move through recess 152.

Hardened steel sleeve 130, body 120a of movable element 120, and cobalt steel washer 150 cannot be penetrated by a drill. Thus, an unauthorized user is prevented from drilling a hole through outer rotatable member 108 into inner cylindrical member 106. Through such a hole, an unauthorized user may insert a pin to lock outer rotatable member 108 to inner cylindrical member 106 so that a wrench applied to the outer rotatable member by the unauthorized user can rotate the inner cylindrical member. The disclosed embodiments help stop a hole being drilled and, thereby, prevent the rotation of valve operating stem 24 of valve 22. The feature of a cobalt body 120a of movable element 120 also prevents a hole being drilled from the topside of inner cylindrical member 106.

It is within the scope of the disclosed embodiments to equip magnetic valve security device 40 shown in FIGS. 1-7 with a cobalt steel washer, such as washer 150, as well as make collar 88 of hardened steel.

The aforementioned arrangements provide enhanced security for fire hydrant valves that are constantly under assault by vandals, criminals, terrorists and unauthorized users.

It will be apparent to those skilled in the art that various modifications and variations can be made in the disclosed embodiments of the magnetic valve security device for a fire hydrant without departing from the spirit or scope of the invention. Thus, it is intended that the present invention covers the modifications and variations of the embodiments disclosed above provided that the modifications and variations come within the scope of any claims and their equivalents.

What is claimed is:
1. A magnetic valve security device for a fire hydrant,
wherein the fire hydrant includes a valve stem, the valve stem having a valve nut, the valve stem being connected to a valve wherein rotation of the valve stem opens and closes the valve,
the device comprising:
an inner cylindrical member having a lower end with a recess to receive the valve nut in a non-rotational relationship, and an upper end with a first coupling element;

an outer rotational member mounted over the inner cylindrical member for rotation with respect to the inner cylindrical member, the outer rotational member including a second coupling element; and a movable element including a non-magnetic cobalt body configured to embed a fitted magnetizable piece such that the fitted magnetizable piece is flush with the non-magnetic body, the movable element urged to a first position, to decouple the first and second coupling elements, the movable element being moveable to a second position to couple the first and second elements in a non-rotational relationship, wherein rotation of the outer rotational member rotates the inner cylindrical member to rotate the valve stem and operate the valve with the movable element in the second position.

2. The device of claim 1, wherein the first coupling element is a non-round recess in the inner cylindrical member and the second coupling element is a non-round recess in the outer rotational member, the moveable element having a cross section that complements the non-round recesses, whereby when the moveable element is drawn into the recess of the outer rotational member, the outer rotational member rotationally couples with the inner cylindrical member to rotate the valve stem nut.

3. The device of claim 1, further comprising a knurled surface on the exterior of the inner cylindrical member for engaging the circular wall if an attempt is made to grip the inner cylindrical member with the outer member by applying a force to the outer rotational member tilting the outer rotational member, so that the inner cylindrical member binds with the wall of the recess to prevent the inner cylindrical member from turning with respect to the fire hydrant cap.

4. The device of claim 1, further comprising a fire hydrant cap for being fixed with respect to the fire hydrant with a recess therein in which the valve nut is positioned, the recess having a circular wall surrounding the nut.

5. The device of claim 1, further comprising a wrench mechanically interlockable with the outer rotational member for rotating the outer rotational member, the wrench further including a reaching permanent magnet having a magnetic field integral therewith and alignable with the movable element for moving the movable element from the first to the second position.

6. The device of claim 1, wherein the fitted magnetizable piece is comprised of stainless steel.

7. The device of claim 1, wherein the fitted magnetizable piece is circular.

8. The device of claim 1, wherein the non-magnetic cobalt body is heavier than the fitted magnetizable piece.

9. The device of claim 1, further comprising an intermediate sleeve of hardened steel positioned between the inner cylindrical member and outer rotational member.

10. The device of claim 1, further comprising a cobalt steel plate disposed perpendicular to the axis of the members between the inner cylindrical member and outer rotational member to prevent drilling through the outer rotational member into the inner cylindrical member by linking the outer and inner members together without shifting the movable element.

11. The device of claim 1, further comprising an intermediate sleeve disposed between the inner cylindrical member and outer rotational member for rotation with respect to both members, the intermediate sleeve being restrained in axial movement by engagement with a radially extending surface on the inner cylindrical member and having an outwardly opening circular groove therein juxtaposed with the inwardly opening circular groove of the outer rotational member.

12. The device of claim 11, further comprising a retaining ring disposed in the grooves.

13. The device of claim 12, wherein the retaining ring is made of resinous material.

14. The device of claim 11, further comprising a sleeve of resinous material disposed between the intermediate sleeve and the inner cylindrical member to minimize the opportunity for welding the members together in an attempt to defeat the device.

15. A magnetic valve security device for a fire hydrant comprising:

an inner cylindrical member having a lower end and an upper end with a first recess;

an outer rotational member mounted over the inner cylindrical member having a lower portion with a second recess aligned opposite the first recess; and a movable element located between the first recess and the second recess, the movable element having a non-magnetic cobalt body to embed a fitted magnetizable piece such that the fitted magnetizable piece is flush with the non-magnetic body, wherein the movable element is located in a first position within the first recess and movable to a second position between the first recess and the second recess using a magnetic force applied to the fitted magnetizable piece so as to couple the inner cylindrical member with the outer rotational member.

16. The device of claim 15, wherein the non-magnetic cobalt body of the movable element is heavier than the fitted magnetizable piece.

17. The device of claim 15, wherein the first recess and the second recess have a non-round shape.

18. The device of claim 15, wherein the inner cylindrical member resides in a domed top of the fire hydrant and the outer rotational member is not connected to the domed top.

* * * * *